Stanley A. Bynum
INVENTOR.

BY [signature]

ATTORNEY

United States Patent Office 3,505,551

Patented Apr. 7, 1970

3,505,551

PHOTOCONDUCTIVE LAYER HAVING REDUCED RESISTIVITY PORTIONS IN PATTERN FORM

Stanley A. Bynum, Dallas, Tex., assignor to General Electrodynamics Corporation, Garland, Tex., a corporation of Texas Filed Oct. 24, 1966, Ser. No. 588,979
Int. Cl. H01j *31/26*
U.S. Cl. 313—65 6 Claims

ABSTRACT OF THE DISCLOSURE

A photoconductive target for a vidicon tube or the like, said target having a white reticle pattern thereon created by reaction of a reactive material with the photoconductor.

Figures 1, 2:
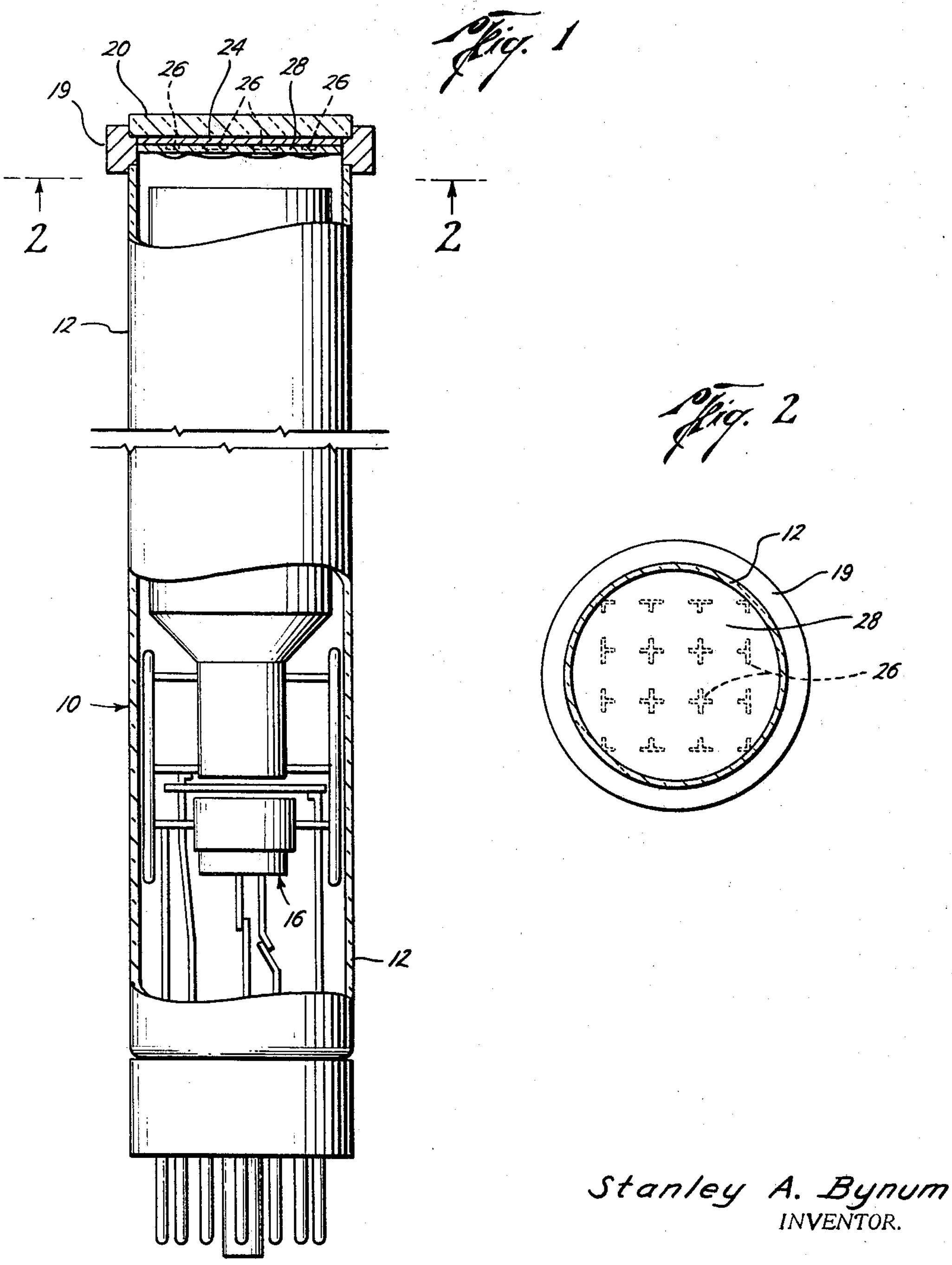

This invention relates to devices which transduce optical images into electrical signals, and more particularly it relates to photoconductive targets of the type that are used in television camera pickup tubes, and to means for forming reference marks or reticles on such targets.

Various electronic devices are known which utilize photosensitive materials for the production of electrical signals from optical images or from images produced by other types of radiation. Among these devices is the vidicon television camera tube, and the following description will be principally in terms of the application of the present invention to the vidicon tube, although, as will become apparent, the invention has equal applicability to many other devices utilizing photoconductive materials. As is well known, and described, for example, in U.S. Patent No. 2,745,032 to Forgue et al., a vidicon camera tube consists of an electron gun and a target assembly contained in a glass envelope, usually about six inches long and one inch in diameter. The electron gun may be of the conventional type used in other types of television pickup tubes. The target assembly usually comprises a film of light-transparent, electrically conductive material on the face plate of the envelope and a coating of photoconductive material deposited upon the electrically conductive film. The target and the gun are so arranged within the envelope that the electron beam from the gun scans the photoconductive surface of the target.

In a vidicon tube, the focusing of an image on the photoconductive surface of the target produces a conductivity pattern corresponding to the pattern of the image focused thereon. As is well known in the art, the scanning of this conductivity pattern by the electron beam results in the production of a signal which may be transmitted and picked up by a suitable receiver.

When such a tube is used in a camera for viewing an object having unknown lateral dimensions, such as, for example, configurations on the moon or on various planets, it is highly desirable to provide means for measuring such lateral dimensions. It is known in the art to provide for this purpose a pattern of reticles on the face plate of the camera tube. The reticles comprise reference marks which provide a scale of reference for measurement. In other words, two signal-producing marks may be placed on the face plate at a known distance apart, and this known distance, being reproduced by the receiver, can then be used as a scale to determine dimensions of objects viewed by the camera.

In the past black reticles have been produced by depositing an opaque material in a desired pattern on the face plate. However, such black reticles are often not visible on the receiver if the object being viewed is very dark.

According to the present invention, a target is provided which will produce a signal which will generate a white reticle on the receiver. A white reticle is visible even under conditions of very low illumination and will show up even on a bright, white surface.

As is well known in the art, photoconductive materials have a very high resistivity in the dark, but become conductive during exposure to light. A good photoconductor for a vidicon tube loses this conductivity quickly when the light exposure ceases, so that it quickly becomes nonconductive. When the electron beam passes over a conductive area, a signal is generated which causes a light spot to appear on the receiving screen. When it passes over a dark area, a dark spot results on the receiving screen.

In accordance with the invention, a white reticle is produced by depositing, in contact with the photoconductive material of the target, a pattern of a material which will react with the photoconductive material to reduce its dark resistance at the points of deposition of the reticle material, so that when the photoconductor is scanned by the electron beam, a signal is generated which will result in a white reticle on the receiver.

For a better understanding of the invention, reference is now made to the following description and to the accompanying drawing, wherein FIGURE 1 shows a longitudinal and partly sectional view of one form of vidicon camera tube embodying the present invention; and FIGURE 2 shows a face plate of a vidicon camera tube embodying the present invention, with parts of the coatings broken away.

FIGURE 1 shows a vidicon type camera tube, indicated generally by the reference numeral 10, which comprises an evacuated envelope 12 having an electron gun 16 in one end thereof. The electron gun 16 may be any of the known types of electron guns and produces an electron beam directed toward the target electrode 18 in the other end of the envelope 12. The electron beam is focussed and scanned over the exposed surface of the target electrode by any conventional means (not shown).

The target electrode 18 is attached to a metal ring 19 made of a metal such as Kovar which is sealed, by means well known in the art, to the edge of the target electrode and to the end of the envelope 12. The target electrode comprises a transparent face plate or substrate 20 preferably made of glass or fused quartz or the like.

According to the present invention, a transparent conductive layer 24 is deposited upon the substrate 20. Then the reticle material 26 is deposited on the conductive layer 24 and a photosensitive layer 28, which in the case of the vidicon is a photoconductive layer, is applied to cover the conductive layer 24 and the reticle material 26.

The conductive layer 24 and the photoconductive layer 28 may be deposited by any convenient means well known in the art such as, for example: vacuum evaporation, vapor reaction, plating, settling, spraying, or any other method which produces the desired physical and electrical characteristics as are well known in the art. It will be appreciated that for clarity, the thicknesses of these layers are greatly exaggerated on the drawing since they are normally very thin, sometimes less than 0.001 inch in thickness.

Various transparent layers well known in the art may be used for the layer 24 herein. For exaple, such materials as are known include tin oxide, indium sesquioxide and cadmium oxide. Furthermore, various photoconductive materials well known in the art may be used for the purposes of this invention. Photoconductors particularly well known for use in vidicons include antimony trisulfide and selenium-sulfur. The application and use of these photoconductive materials are described in detail in, for example, the aforesaid Patent No. 2,745,-032, as well as U.S. Patents 2,744,837 and 2,967,254.

In the embodiment of the invention shown in the drawing, the reticles 26 are shown spaced apart in a pattern, preferably with a definite predetermined distance between the reticles. Actually, the reticles normally comprise very narrow lines so that they do not obscure any major proportion of the picture.

The reticles may be formed on the conductive coating by placing a stencil mask having the desired pattern over the conductive coating and evaporating through the stencil mask a material which will react chemically with the photoconductor to be applied, so as to destroy or substantially reduce the dark resistivity of the photoconductor at the point of contact. Where a selenium-sulfur photoconductor is to be used, tellurium is a particularly good material from which to form the reticles. Conveniently, the tellurium may be evaporated through the stencil mask in a high vacuum at a temperature, for example, of approximately 350° centigrade. In a convenient manner of evaporation, the tellurium is held within an open metal boat, made of a material such as Nichrome V, and heated sufficiently to evaporate the tellurium so that it is deposited through the mask on the conductive layer of the target. Normally, the metal boat will be held approximately 4 inches from the point at which the material is to be deposited. The tellurium is preferably deposited in a layer of such thickness as to not reduce the optical transmission of the target at the point of deposition more than about 10% or so.

After the tellurium pattern has been deposited, the selenium-sulfur photoconductor is deposited on top of it, and then the entire target is baked, as is well known in the art, to increase its sensitivity. During such baking process, the tellurium reacts with the selenium-sulfur photoconductor so as to greatly decrease the dark resistance of the photoconductor at the point of contact with the tellurium. It will be appreciated that since the dark resistance is decreased the photoconductor is conductive at that point even in the dark, so that a white signal is produced at every scan of the electron beam over that point.

Other materials which react with the photoconductor to reduce the dark resistance also may be used. For example, when an antimony trisulfide photoconductor is used, the reticle pattern may be formed with indium or with thallium. With a selenium-sulfur photoconductor, iodine may be used as well as tellurium. It is, of course, necessary that the material used to form the reticle pattern be a solid.

It will, therefore, be apparent that many modifications of this invention will occur to those skilled in the art upon consideration of the description of the embodiments herein, and therefore the invention is not limited to such embodiments but only as set forth by the appended claims.

What is claimed is:

1. A photoconductive target comprising
a transparent substrate,
a transparent conductive layer on said substrate,
a selenium-sulfur photoconductive layer on said conductive layer, and
a material selected from the group consisting of tellurium and iodine deposited in contact with only a portion of the photoconductive layer, leaving another portion of the photoconductive layer not in contact with said material.

2. A photoconductive target as defined by claim 1 wherein
the material which reacts with the photoconductor is tellurium.

3. A vidicon tube comprising
an evacuated envelope,
a target in one end of said envelope, and
an electron gun in said envelope for producing an electron beam to scan said target,
said target comprising
a transparent substrate,
a transparent conductive coating on said substrate,
a selenium-sulfur photoconductive coating on said conductive coating, and
a material selected from the group consisting of tellurium and iodine deposited in contact with only a portion of the photoconductive layer leaving another portion of the photoconductive layer not in contact with said material.

4. A vidicon tube as defined by claim 3, wherein
the material which reacts with the photoconductor is tellurium.

5. A photoconductive target comprising
a transparent substrate,
a transparent conductive layer on said substrate,
a layer of antimony trisulfide on said conductive layer, and
a material selected from the group consisting of indium and thallium deposited in a reticle pattern in contact with the layer of antimony trisulfide.

6. A vidicon tube comprising
an evacuated envelope,
a target in one end of said envelope, and
an electron gun in said envelope for producing an electron beam to scan an area of said target,
said target comprising
a transparent substrate,
a transparent conductive coating on said substrate,
a coating of antimony trisulfide on said conductive coating, and
a material selected from the group consisting of indium and thallium deposited within said scanned area in contact with only a portion of the antimony trisulfide layer, leaving another portion of the antimony trisulfide layer not in contact with said material.

References Cited

UNITED STATES PATENTS

| | | | |
|---|---|---|---|
| 2,662,832 | 12/1953 | Middleton et al. | 117—64 |
| 2,962,376 | 11/1960 | Schaffert | 96—1 |
| 3,252,029 | 5/1966 | Shallcross | 313—65 |
| 3,290,530 | 12/1966 | Heagy. | |
| 2,890,359 | 6/1959 | Heijne et al. | |
| 3,192,067 | 6/1965 | Jordan et al. | |

OTHER REFERENCES

RCA TN No. 123: "Vidicon With Target Reticle," by Sidney Gray, 1958.

Kuzminski: RCA Technical Notes, RCA TN No. 141 (prior to 1966).

ROBERT SEGAL, Primary Examiner

U.S. Cl. X.R.

313—109.5, 94